Oct. 18, 1927.  
G. INNES  
1,646,251  
GRAIN SHOCKER  
Filed Dec. 1, 1923  
9 Sheets-Sheet 2

Inventor-
George Innes,
by his Attorneys

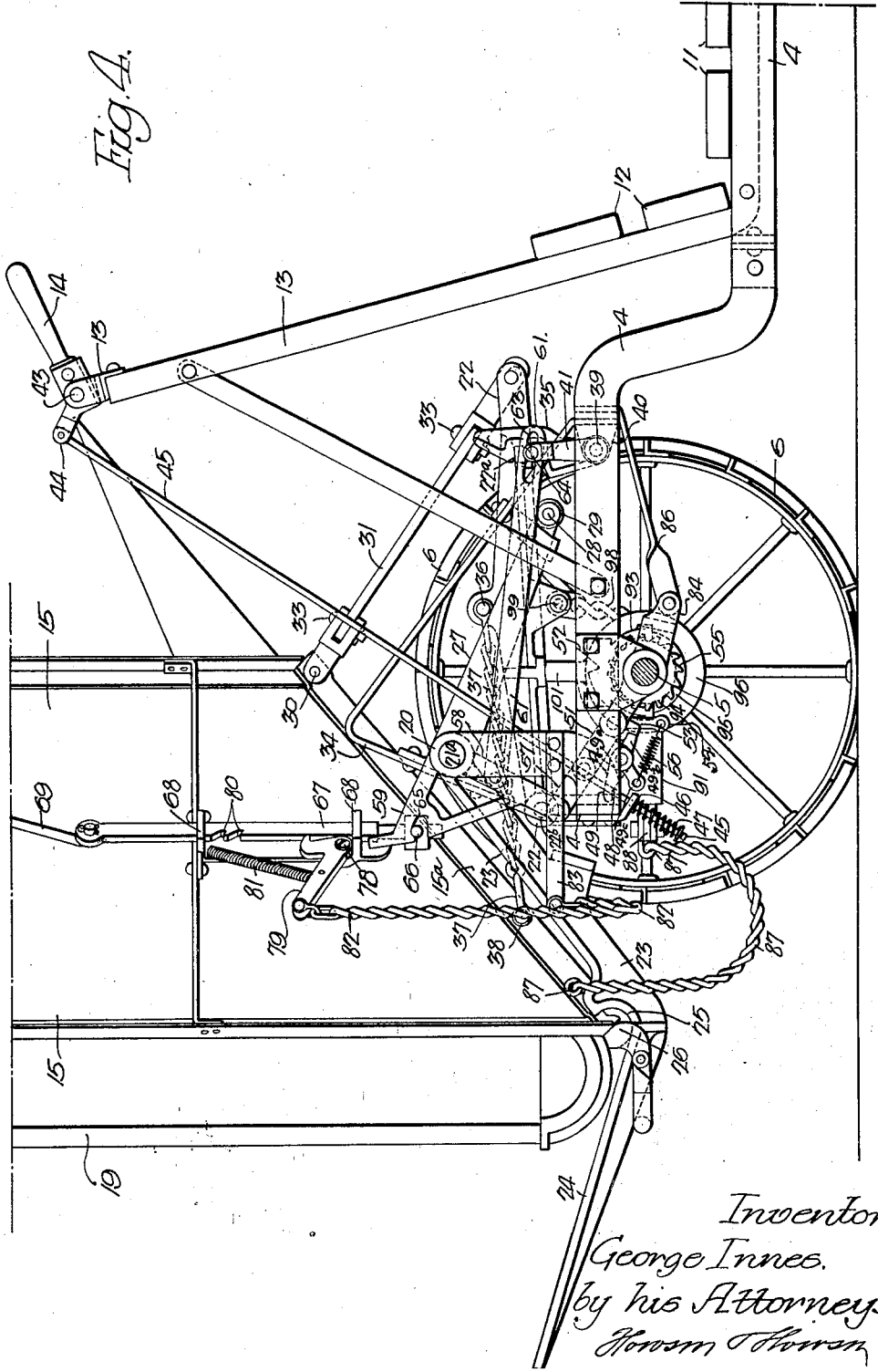

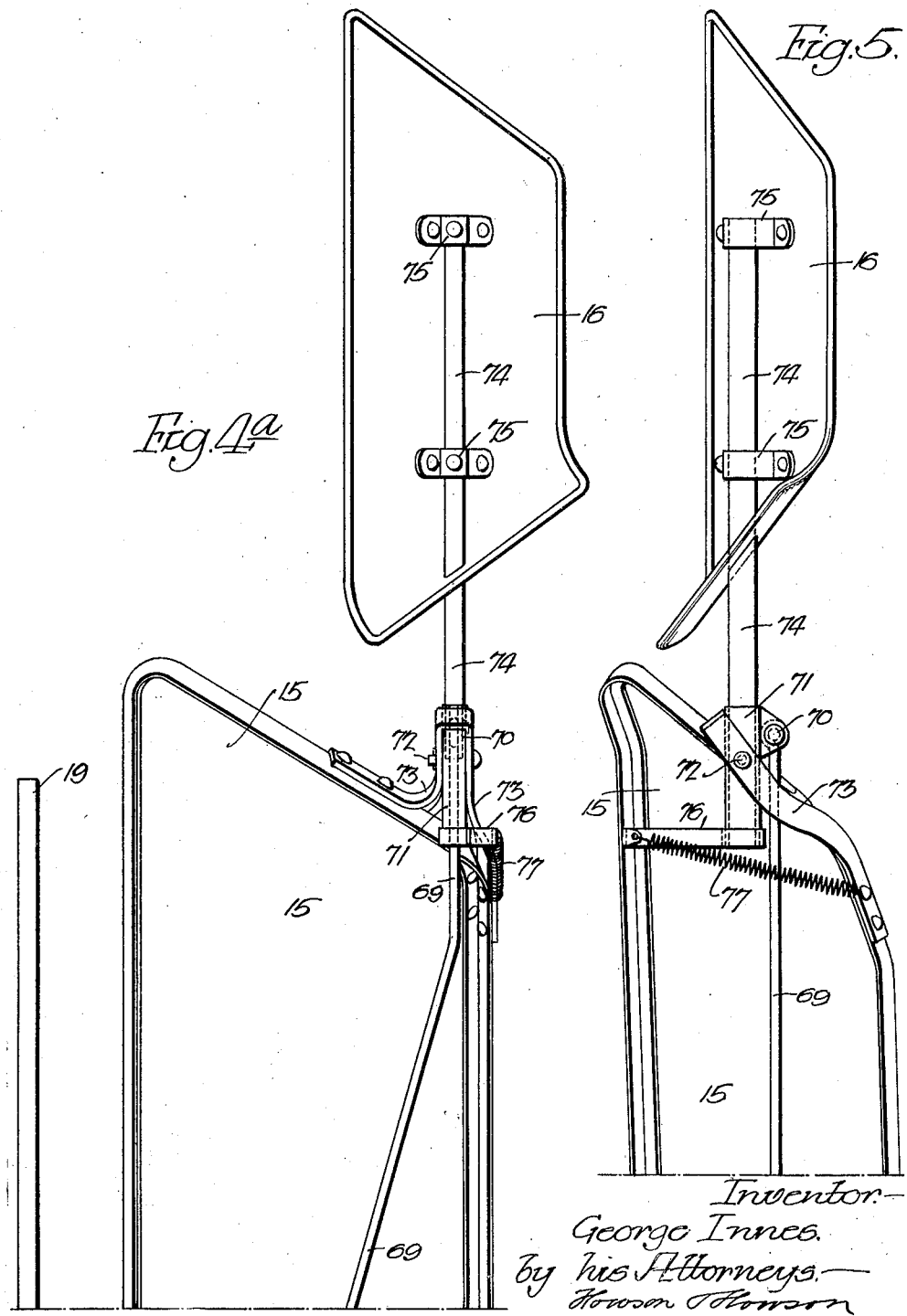

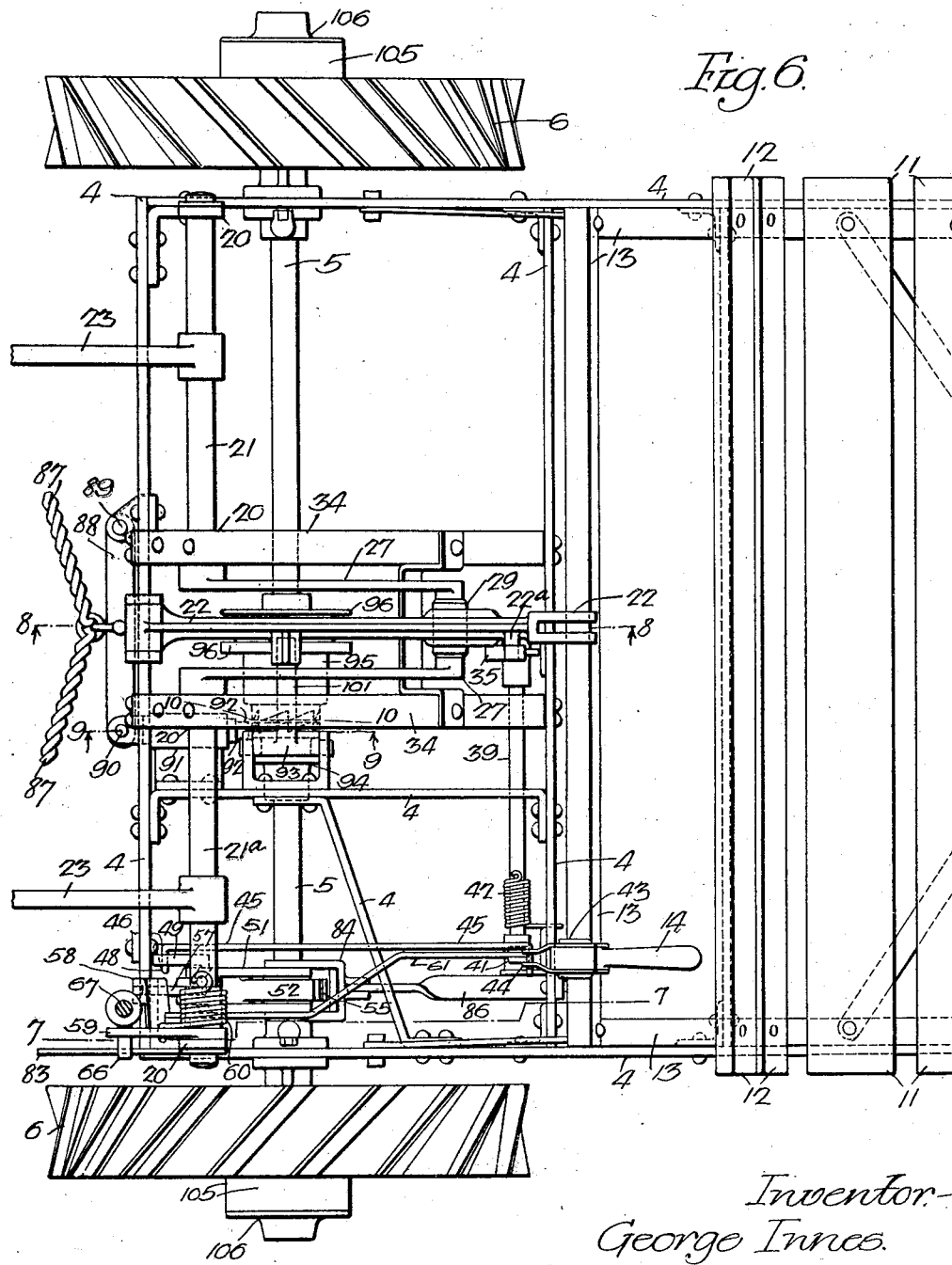

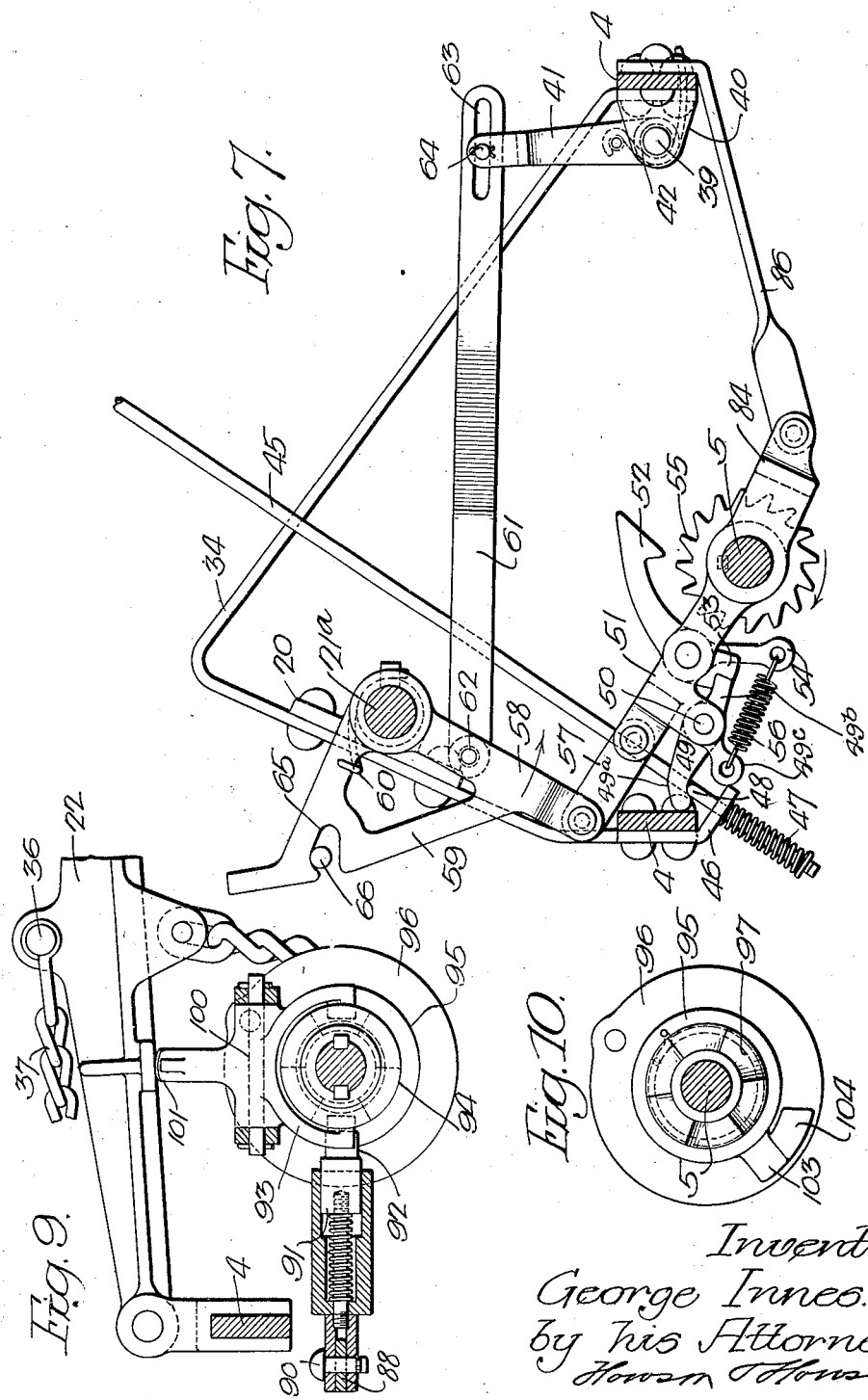

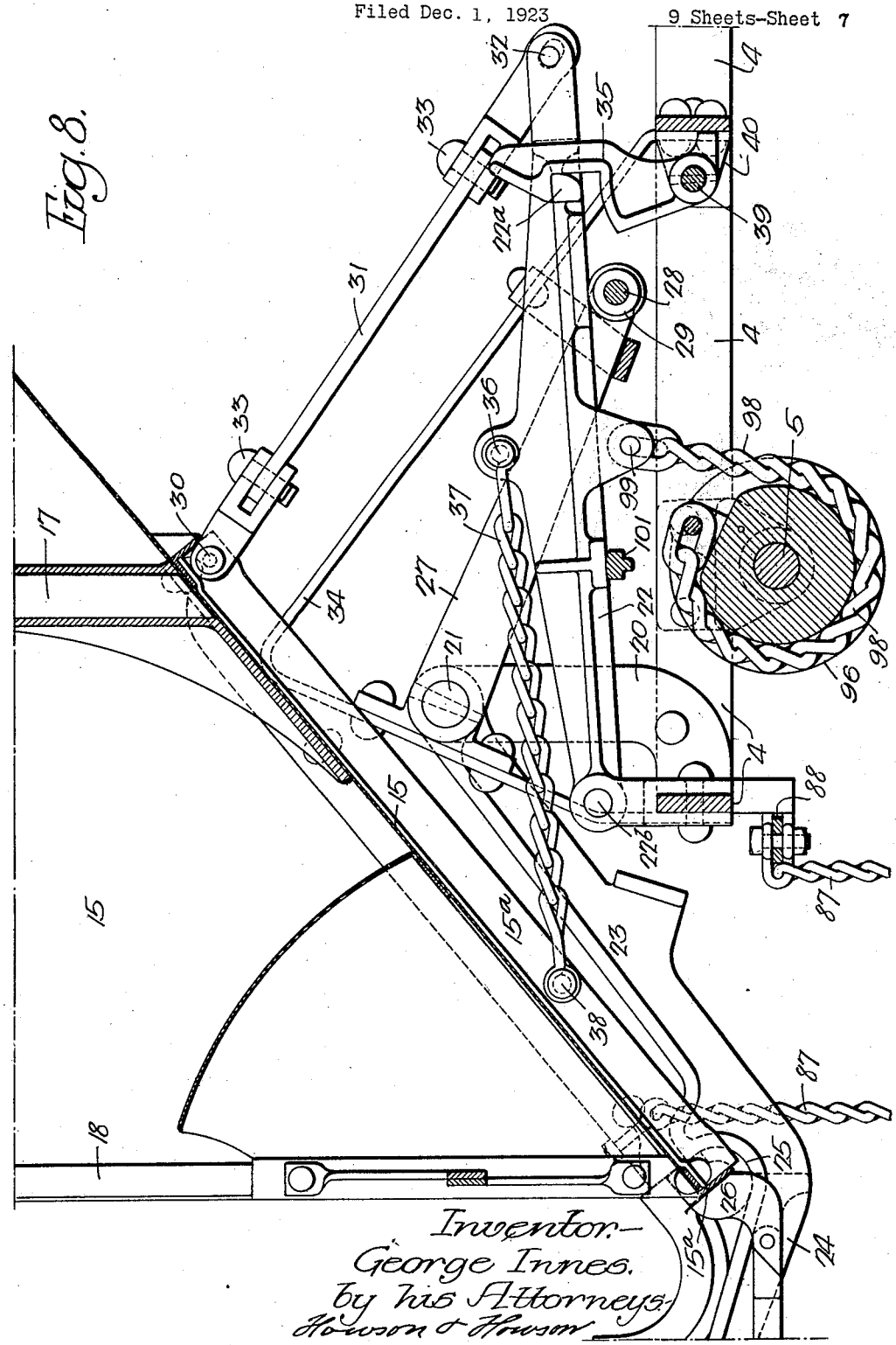

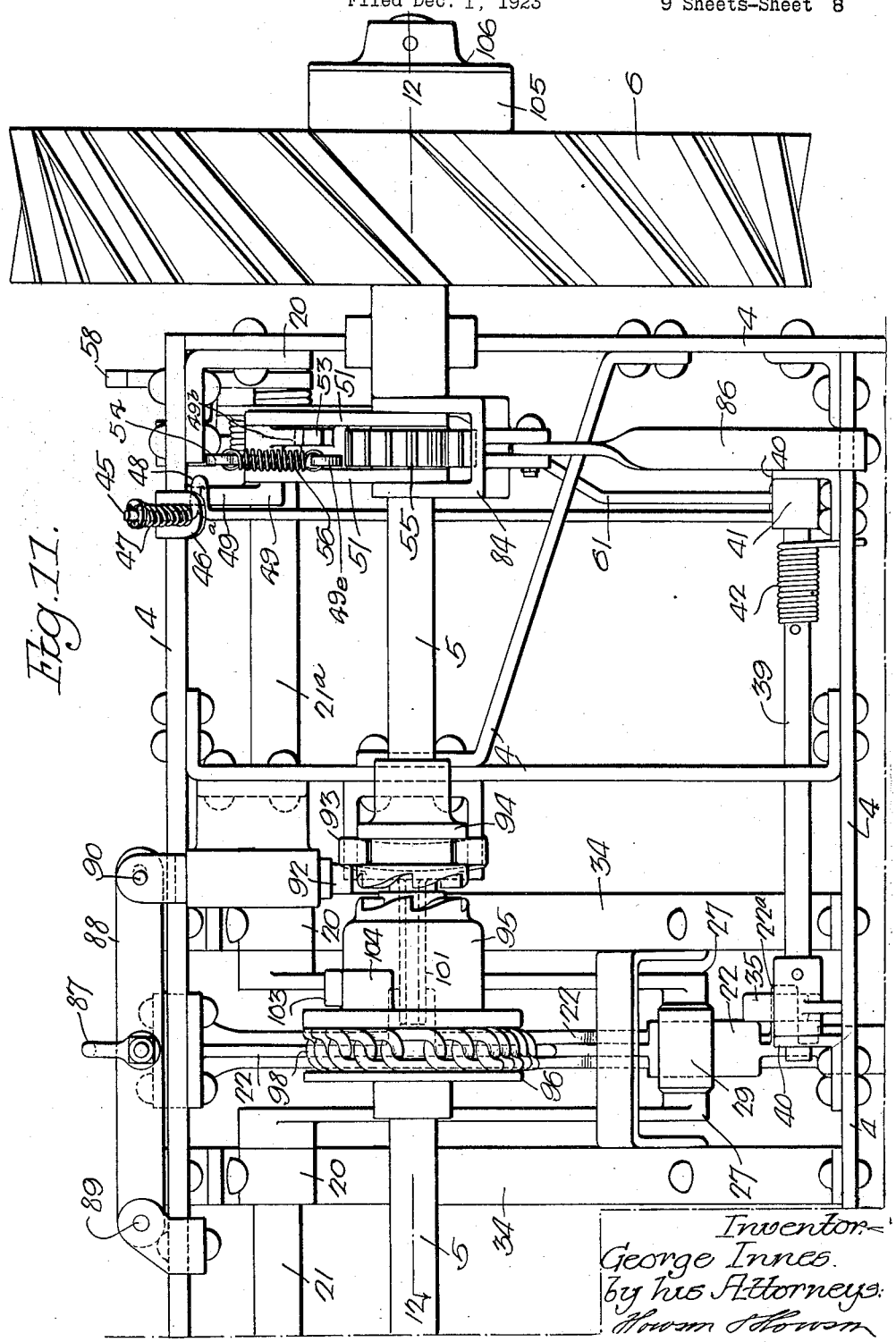

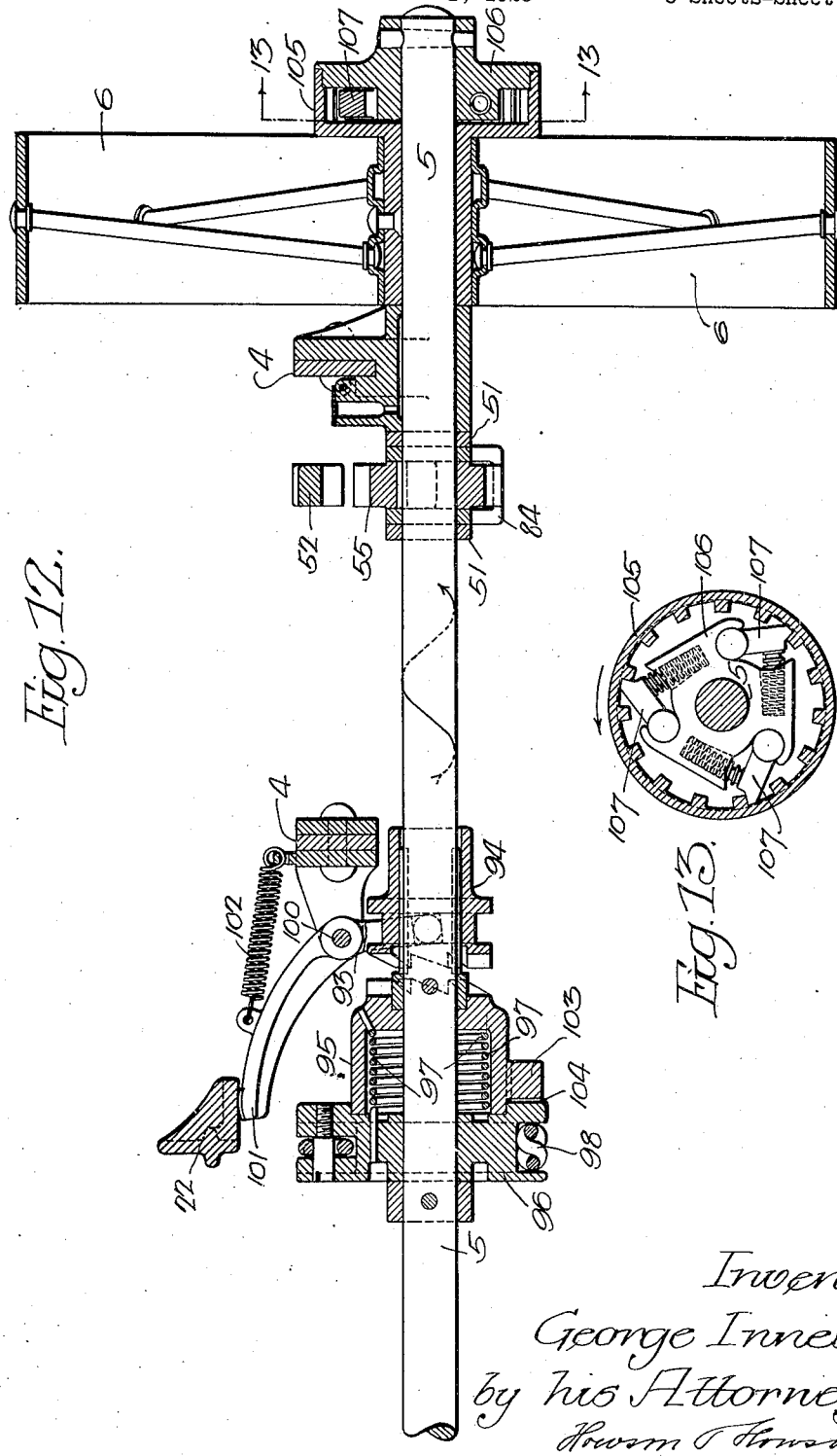

Patented Oct. 18, 1927.

1,646,251

UNITED STATES PATENT OFFICE.

GEORGE INNES, OF DAVENPORT, IOWA.

GRAIN SHOCKER.

Application filed December 1, 1923. Serial No. 677,981.

One object of my invention is to provide means for forming bundles of grain into a shock, as the bundles come from a binder.

A further object of the invention is to design the mechanism so that an operator can be located between the binder and the basket in which the shock is formed, whereby he is enabled to take a bundle, as it leaves the binder, and place it in the basket.

The invention also relates to details of construction, which will be fully described hereinafter.

In the accompanying drawings:

Fig. 4 is an enlarged side elevation of the lower portion of the basket and its operating mechanism;

Fig. 4ª is a side elevation of the upper portion of the basket, showing the gate for closing the open end thereof;

Fig. 5 is a front elevation of a portion of the basket with the gate attached, as shown in Fig. 4ª;

Fig. 6 is a plan view of the mechanism shown in Fig. 4, the basket being removed;

Fig. 7 is a sectional elevation on the line 7—7, Fig. 6, illustrating the gate operating mechanism and the basket latch trip lever and their complimentary connecting link;

Fig. 8 is a sectional elevation on the line 8—8, Fig. 6, showing the basket with its retaining, releasing and retrieving mechanism;

Fig. 9 is a sectional elevation on the line 9—9, Fig. 6, showing the basket retrieving sheave, a clutch for operating the same, and mechanism for controlling the clutch;

Fig. 10 is a sectional elevation on the line 10—10, Fig. 6, showing the basket sheave and its complementary portion of the operating clutch, also the mechanism by which they are connected to each other;

Fig. 11 is an assembled inverted plan view of the mechanism illustrated in Figs. 7 to 10, inclusive;

Fig. 12 is a sectional elevation on the line 12—12, Fig. 11, and

Fig. 13 is a section on the line 13—13, Fig. 12, illustrating the connecting means between one of the traction wheels and the main operating shaft of the machine.

Figure 1:
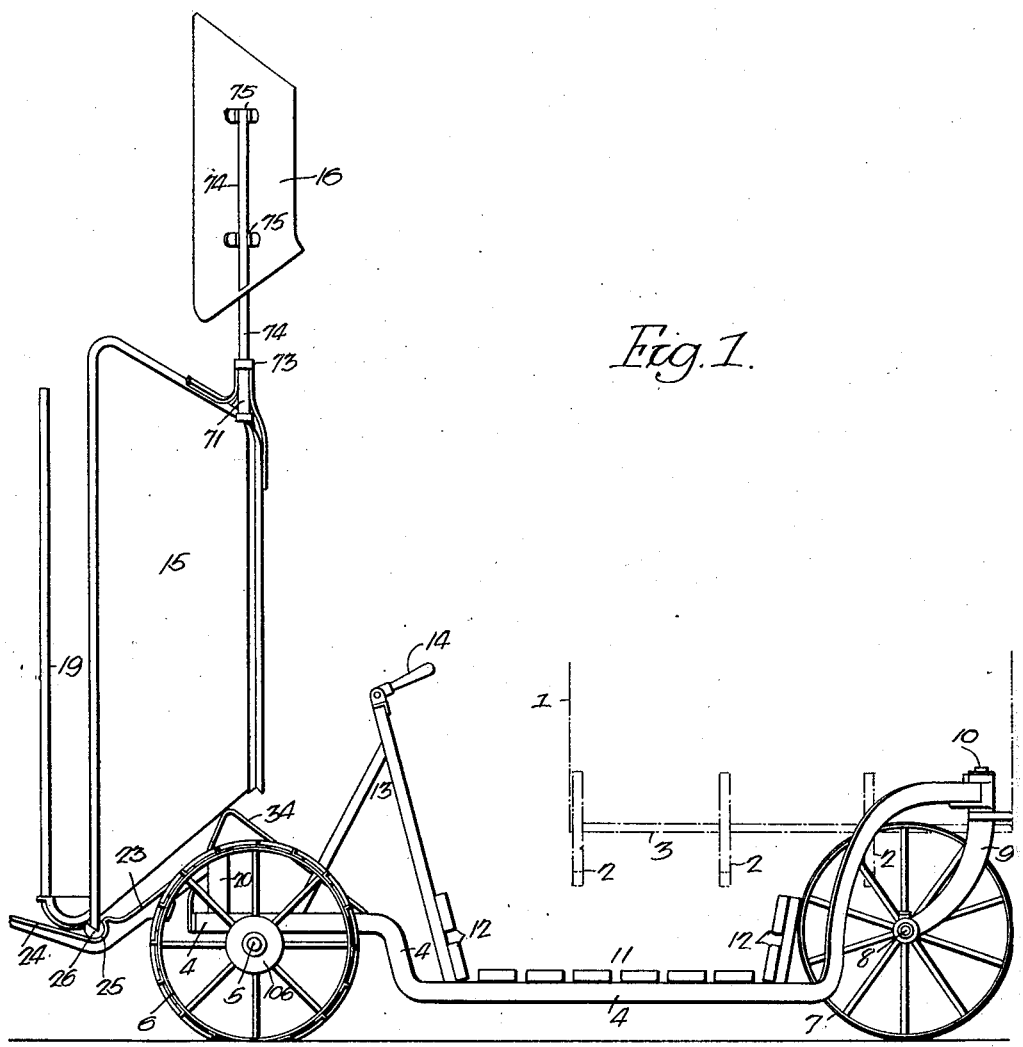
Fig. 1 is a diagrammatic side elevation of my improved grain shocking machine.
Figure 2:
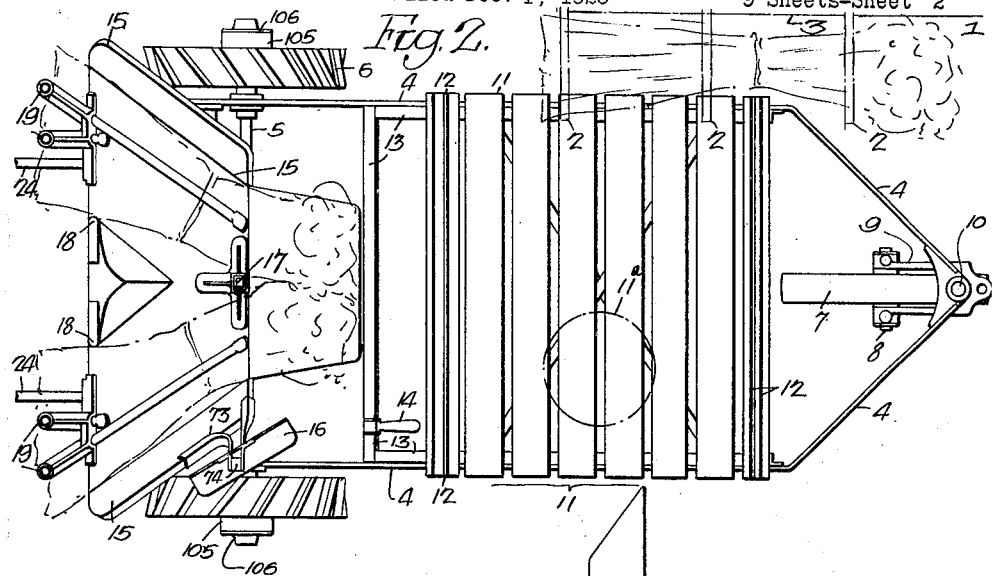
Fig. 2 is a diagrammatic plan view.
Figure 3:
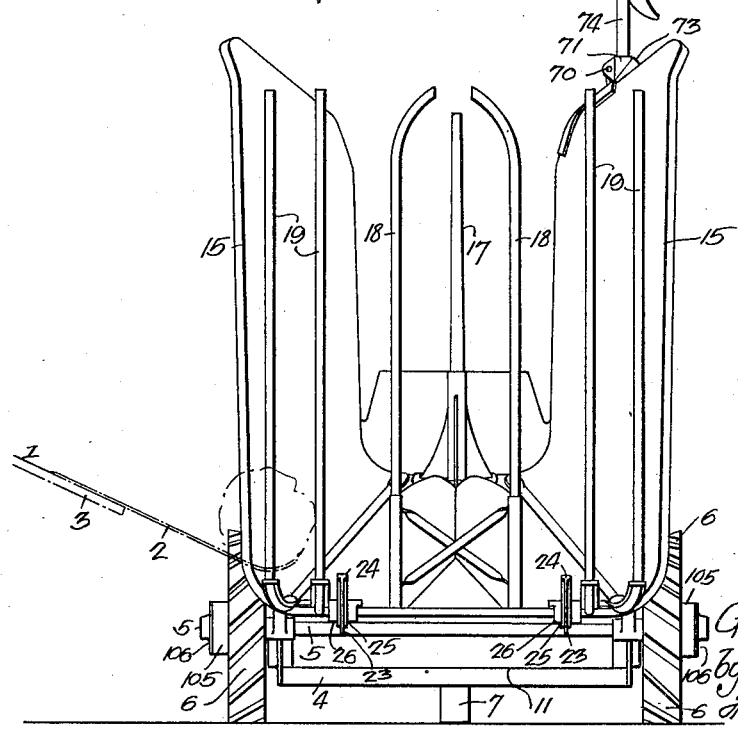
Fig. 3 is a diagrammatic rear elevation.

Referring to Figs. 1, 2 and 3, 1 is the delivery end of a reaper and binder. The bundles of grain are delivered onto arms 2, which form continuations of the deck 3 of the binder. 4 is the frame of my improved shocking device. This frame is mounted on a rear axle 5, which has traction wheels 6, 6 by which power is transmitted to the basket operating mechanism. It is supported at its forward end by a caster wheel 7 that is mounted on a shaft 8, having its bearings in a forked member 9, pivoted at 10 to the frame 4—the whole forming a carriage for the basket and its operating mechanism. The frame may be connected to the binder in any suitable manner, depending, somewhat, on the type of binder used.

On the frame 4 is a platform 11, which forms an operator's station. This platform is made of spaced slats, in the present instance. At each end of the platform are guard slats 12. The frame is preferably shaped, as shown, with the platform near the ground, obviating the necessity of stooping when the operator handles the bundles of grain.

13 designates a fixed, open frame, which consists of two upright supports and a cross bar. 14 designates an operating handle that is mounted on the frame 13 in position to be grasped readily by the operator. This handle controls the mechanism for releasing the basket 15 to discharge its load. The basket returns automatically to its vertical position after depositing the shock on the ground.

16 designates a gate that closes the end of the basket after the basket has received a given number of bundles, and remains in a closed position until the shock becomes inert on the ground.

17 designates a front, vertical separating standard for the heads of the bundles and 18—18 designate two rear, vertical standards spaced apart so as to separate the butts of the bundles. These standards are curved towards each other at their upper ends.

19, 19 designate the rear runners, which line up the bundles to form a shock, and act to support the basket as it is drawn away from the deposited shock.

The operator stands upon the platform within easy reach of the delivery end of the binder and the basket. As the bundles are delivered from the binder, they are taken by the operator and are placed in proper position in the basket—one bundle being on one side of the standards and the next bundle being on the opposite side of the standards. The bundles of grain, when undergoing the binding operation, assume an elliptical form in transverse section and present substantially flat parallel side faces when delivered therefrom, on the binding deck of the harvesting machine. The operator, when arranging the bundles in the basket, places each bundle on edge therein with the major axis of its transversal ellipse parallel to the longitudinal centre line of the basket, and its head in engagement with and in opposed relation to the bundle occupying a similar position at the opposite side of the standards in the basket.

The basket is flared, as shown, and is wider at the rear than it is at the front so that the shock is tapered, and is provided with a wide base with an open center for the free circulation of air.

When a shock is formed in the basket, the operator presses the handle 14, thereby releasing the automatic mechanism, which, first, closes the gate 16, which, in turn, trips the latch that retained the basket in an upright position on the carriage. The basket, being free to fall, deposits the shock upon the ground, and remains with the shock. The gate remains closed until the shock becomes inert—the carriage moving a predetermined distance away from the shock. The gate is then released automatically and the basket is withdrawn from the shock. When the basket is clear of the shock, it is returned automatically to its vertical position on the carriage to receive another series of bundles, which are formed into a shock.

The detail mechanism will now be described.

20, 20 designate bearings that are mounted on the rear of the frame 4. In these bearings are mounted rock shafts 21, 21$^a$, split and spaced apart, as shown in Fig. 6, to allow for the free movement of the retrieving bar 22, which is pivoted to the frame 4 at 22$^b$. On the rock shafts 21, 21$^a$ are arms 23, which have angular extensions 24. These arms support the lower end of the basket 15 and have sockets 25 for pivot members 26 that are formed on the lower edge of the basket.

On the rock shafts 21, 21$^a$ are forwardly extending arms 27, which are connected at their outer ends by a pin 28 on which is mounted a roller 29, located across the path of the bar 22 in order that it may be forced down by the bar to raise the lower edge of the basket while the bar is retrieving the same after depositing a shock upon the ground. The bar 22 retains the basket in position until released.

15$^a$ designates the frame of the basket. Connected to the forward end of the basket by a pin 30 is a bar 31. The opposite end is attached to the bar 22 by a pin 32. The bar 31 is slotted, a shown in Fig. 8. The bar 31 is made in three sections, as shown in Fig. 8. These sections are pivotally connected by pins 33 at right angles to the pins 30 and 32 so that the bar can have a universal movement to accommodate the basket. The bar 31 holds the basket against the supports 34 when the basket is in the receiving position, and returns the basket to the upright position.

The bar 22 is held down by a latch 35, Fig. 8. Connected to the bar 22, at 36, is a chain 37, which is connected to the basket at 38, near its lower end, to insure the pivots 26 returning to the sockets 25. The latch 35 is secured to a transverse shaft 39, which is mounted in bearings 40 on the frame 4. On the opposite end of the shaft is a trip lever 41.

42 is a spring, which tends to keep the latch closed.

The latch 35 has a limited movement, as shown in Fig. 8, and its outer end is beveled. By this construction, as the bar 22 is moved down, its lug 22$^a$ strikes the beveled portion of the latch, which snaps back and engages the lug, as in said figure.

In order to close the gate when the basket is loaded and to release the bar 22 to allow the basket to fall, a mechanism is provided, which is actuated by the shaft 5 when the operator presses down upon the operating handle 14. The handle 14 is pivoted at 43 to a frame 13 and has an arm 44, which is connected to a rod 45 that extends through a bearing 46 on the main frame 4. A spring 47, on the bar, tends to hold the handle in the raised position. The rod 45 is offset at 48 to form a shoulder to engage one arm 49$^a$ of a lever 49, which is pivoted at 50 to a pawl carrier 51 that is loosely mounted on the axle 5. On the carrier is a pivoted pawl 52, which has a heel 53 that is arranged to be engaged by a second arm 49$^b$ of the lever 49 to hold the pawl out of engagement with a ratchet wheel 55, secured to the axle 5. Connected to a third arm 49$^c$ of the lever 49 and to an arm 54 on the pawl 52 is a spring 56. This spring holds the arm 49$^b$ of the lever 49 in contact with the heel 53 of the pawl and forces the pawl into engagement with the ratchet wheel 55, when the pawl is released.

The pawl carrier 51 is connected by a link 57 to an arm 58 of a lever 59, pivoted freely on the rock shaft 21$^a$. A spring 60 tends to return the lever to the position shown in Fig. 7.

61 designates a rod that is pivoted to the lever 58 at 62. This rod is slotted at 63 for a pin 64 on the trip lever 41 so that, when the lever 58 is moved in the direction of its arrow, Fig. 7, it will move the latch 35 clear of the lug 22ª, releasing the bar 22 and allowing the basket to fall. The lever 58 is notched at 65 to receive the pin 66 on a collar that is secured to the end of the gate rod 67, which is arranged to slide in bearings 68 on the basket 15. The gate rod is pivotally connected to a second gate rod 69, which is attached at 70 to a socket frame 71, pivoted at 72 on a bearing 73 that is secured to the upper end of the basket.

74 designates a gate-carrying bar, preferably of wood, and mounted in the socket frame 71. The gate 16 has clips 75 to which the bar 74 is attached. On the socket frame 71 is an arm 76 to which is attached a coil spring 77. This spring is attached to the basket, as shown in Fig. 5, so that, when the gate is raised, the spring holds it in the raised position. When the gate is closed, the spring 77 moves past the pivot 72 and holds the gate in the closed position.

Pivoted at 78 to the bearing 68 is a latch 79, which is arranged to engage the notch 80 in the gate rod 67, Fig. 4. A spring 81 tends to hold the latch in engagement with the rod. The latch is connected by a chain 82 to an arm 83 on one of the bearings 20. The latch 79 engages the gate rod 67, when the gate is closed so as to lock the gate positively and retain it in the locked position while the basket is falling and until the slack in the chain 82 is taken up by the forward movement of the machine while the basket is at the ground and the shock is settling. As soon as the slack of the chain is taken up, the gate is released and is opened by the shock as the basket is drawn therefrom.

The mechanism is so timed that the gate is closed before the mechanism is actuated that releases the basket.

When the latch 35 is withdrawn from the bar 22 to allow the basket to fall, the pawl 52 has been moved by the ratchet wheel 55 in contact with a release yoke 84, which is loosely mounted on the shaft 5 and is held by a strap 86 that is attached to the frame 4. As the pawl 52 is withdrawn, the arm 49ᵇ of the lever 49 snaps into engagement with the heel 53 of the pawl 52, as in Fig. 7, holding the pawl out of engagement with the ratchet wheel. The parts are returned to their normal position by the spring 60.

Attached at each side of the basket at the lower end are chains 87, which are connected at a central point to a lever 88 that is pivoted at 89 to the frame 4. The other end of the lever is attached at 90 to a spring-pressed latch pin 91, having an enlarged head 92, which engages the clutch yoke 93 and holds the teeth of the clutch sleeve 94 out of engagement with the teeth on the drum 95, Figs. 9 and 12. At one side of the drum is a sheave 96. Within the drum is a coiled spring 97—one end of which is attached to the sheave.

The other end is secured to the drum. Attached to the sheave is a chain 98, which is passed around the sheave and is attached to lugs on the bar 22 at 99. The clutch yoke 93 is pivoted at 100 to a bracket on the frame 4. This yoke has an arm 101 that extends under the bar 22. A spring 102 is attached to the arm and to the frame and tends to elevate the arm and to hold the clutch in engagement with the drum.

On the drum 95 is a lug 103, which projects into the path of a lug 104 on the sheave 96 so that, when the teeth of the clutch sleeve 94 are thrown into mesh with the teeth on the drum 95, the drum is rotated nearly a full revolution, coiling the spring 97 until the lug 103 strikes the opposite side of the lug 104, when the sheaves will be turned positively, pulling the bar 22 down, thereby retrieving the basket and continuing its downward motion until the lug 22ª passes the nose of the latch 35, when the bar will be held until the mechanism is released again.

The coiling of the spring 97 takes place while the basket is being moved clear of the shock, after the slack has been taken out of the chain 87, and before the basket begins to rise, after which the lug on the drum strikes the lug on the sheave and the basket assumes its vertical position. When the basket is in its vertical position, the bar 22 strikes the arm 101 and moves the clutch sleeve 94 out of engagement with the drum 95.

The traction wheels 6 are mounted loosely on the shaft 5 and have drums 105, 105, which form extensions of the hubs of the wheels 6. The drums have internal teeth, as shown in Fig. 13. Secured to the shaft are hubs 106, 106 that have spring-pressed pawls 107, 107, which engage the teeth of the drums 105, 105. This arrangement allows the shaft to be driven positively, and also allows the wheels freedom of movement on the shaft when turning curves or backing.

It will be apparent from the description that the operator can trip the mechanism for releasing the basket at any time he desires, but, after he trips said mechanism, the remainder of the operation is automatic. The gate is closed and the basket falls to the ground, depositing the shock. When the shock is inert, the gate is opened and the basket is withdrawn from the shock and is raised to its vertical position—the gate remaining open to allow the operator to place the bundles of grain in the basket, after which the operation can be repeated. When the operator presses the handle 14 downward the rod 45 is pulled thereby turning the lever 49 on its pivot which moves the arm 49$^b$ out of engagement with the heel 53 of the pawl 52; the pawl 52 is then moved into engagement with the ratchet wheel 55 by the spring 56. The ratchet wheel 55 being continuously rotated turns the pawl carrier 51 around the axle 5 which through the link 57 turns the lever 59 on its pivot against the action of the spring 60. The lever 59 pulls the gate rod 67—69 downward until the latch 79 enters one of the notches 80 in the gate rod 67 whereby the gate 16 is closed and locked. The pull on the gate rod 69 first turns the gate arm 74 on its pivot until the spring 77 passes over said centre whereupon the arm 74 and the gate 16 are moved the remaining distance by the spring 77 after which the continued rotation of the lever 59 through the rod 61 turns the lever 41 and consequently the shaft 39 and basket latch 35, which releases the basket bar 22. When released the bar 22 turns on its pivot 22$^b$ permitting the arms 27 and consequently the shafts 21 and the arms 23 to turn to a position wherein the arms 23 engage the back frame member 4, the basket 15 thereby being tilted or turned using the apex of the supports 34 as a pivot. The basket thereafter continues to fall until the runners 19 engage the ground, in which position the basket and the contained shock are permitted to remain inert, the machine moving forward and the pivot members 26 sliding out of the sockets 25, on the extensions 24 of the arms 23 and the chains 82 and 87 becoming taut. When all slack is taken out of the chain 82, the catch 79 is released from the notch 80 in the gate rod 67; the first pull on the taut chain 87 turns the lever 88 on its pivot and pulls the latch pin 91 out of engagement with the yoke 93 permitting the clutch element 94 to engage the clutch element on the drum 95 turning said drum against the action of the spring 97 until the lug 103 on the said drum makes approximately a complete revolution and strikes the lug 104 on the sheave 96, the basket in the mean time being drawn from the standing shock by the chain 87. The first relative movement between the basket and the shock caused the gate 16 to be opened partially by the weight of the inert shock and finally by the spring 77 recrossing the pivotal centre 72 of the gate arm 74, the catch 79 having been previously released by the pull of the chain 82.

The latch 52 was released from the ratchet wheel 55 when it struck the release yoke 84 which permitted the arm 59, the pawl carrier 51, pawl 52 and lever 49 to return to their normal positions under the influence of the spring 60, the heel 53 of the pawl 52 being reset back of the arm 49$^b$ of the lever 49 by the contact of the pawl 52 with the yoke 84.

Continued rotation of the drum 95, through the lugs 103 and 104, rotates the sheaves 96 which pulls the chain 88 subsequently turning the bar 22 on its pivot and thereby hauling the basket 15 along the arm extensions 24 until the pivots 26 are seated in the sockets 25 by the chain 37, the gate end of the basket being raised from the ground by the bar 31. The bar 22 continues to turn until the catch 35 engages the lug 22$^a$ on the bar 22 and the said bar engages the yoke cam 101 thereby moving the clutch element 94 out of engagement with the drum 95. During the raising of the basket the gate pin 66 re-enters the notch 65 in the lever 59. The basket is then ready to receive another supply of bundles of grain.

In some instances, a seat may be provided for the operator, as shown by dotted lines 11$^a$, in Fig. 2.

It will be understood that the platform, or operator's station may be modified without departing from the main feature of the invention.

I claim:

1. In apparatus for shocking grain which comprises a carriage having an operator's station thereon and a basket adjacent the station and in reach of the operator so that the operator can receive bundles of grain and place them in the basket to form a shock; the combination of automatic means for causing the basket to assume a shock discharging position; automatic means for permitting the basket to remain in the shock discharging position a predetermined length of time; automatic means for returning the basket to the bundle receiving position; and singular manually operated means for starting the succession of operations of said automatic means.

2. In apparatus for shocking grain which comprises a carriage having an operator's station thereon and a basket adjacent the station and in reach of the operator so that the operator can receive bundles of grain and place them in the basket to form a shock, a gate for closing the open end of said basket; automatically operated means for closing said gate; automatically operated means for depositing the basket in a shock discharging position on the ground; automatically operated means for permitting the basket to remain with the shock while the shock is becoming inert; automatically operated means for removing the basket from the inert shock; automatically operated means for returning the basket to its bundle receiving position on the carriage; and singular manually operated means for starting the succession of operations of the said automatically operated means.

3. In apparatus for shocking grain which comprises a carriage having an operator's station thereon and a basket adjacent the station and in reach of the operator so that the operator can receive bundles of grain and place them in the basket to form a shock, said basket being arranged to be turned from a vertical position to a horizontal position; the combination of means for retaining the basket in the vertical position; a power shaft on said carriage; means operable by said power shaft for releasing the basket to discharge its load; and manually operated means for connecting said power shaft and said basket releasing means.

4. In apparatus for shocking grain which comprises a carriage having an operator's station thereon and a basket adjacent the station and in reach of the operator so that the operator can receive bundles of grain and place them in the basket to form a shock, said basket being arranged to be turned from a vertical position to a horizontal position; the combination of means for retaining the basket in the vertical position; a gate for the basket; a power shaft on the carriage; and means operable by said power shaft for closing the gate and subsequently releasing the basket so that it can fall and deposit a shock upon the ground.

5. In apparatus for shocking grain which comprises a carriage having an operator's station thereon and a basket adjacent the station and in reach of the operator so that the operator can receive bundles of grain and place them in the basket to form a shock; power operated means controlled by a single manually operated element, for depositing the formed shock upon the ground.

6. In apparatus for shocking grain which comprises a carriage having an operator's station thereon and a basket adjacent the station and in reach of the operator so that the operator can receive bundles of grain and place them in the basket to form a shock, said basket being arranged to be turned from a vertical position to a horizontal position; the combination of means for retaining the basket in the vertical position; means for manually releasing the basket to allow it to fall to the horizontal position; means for permitting the basket to remain in the horizontal position a predetermined length of time; and means for automatically returning the basket to the vertical position after the shock has been discharged on the ground.

7. In apparatus for shocking grain which comprises a carriage having an operator's station thereon and a basket adjacent the station and in reach of the operator so that the operator can receive bundles of grain and place them in the basket to form a shock, said basket being arranged to be moved from a vertical position to a position to discharge a shock; the combination of a pivot element on said basket; a support for said pivot element on said carriage; means for allowing the pivot portion of the basket to slide on its support; means for drawing the pivot portion back into position as the basket is raised; and means for raising the basket after depositing a shock upon the ground.

8. In apparatus for shocking grain which comprises a carriage having an operator's station thereon and a basket adjacent the station and in reach of the operator so that the operator can receive bundles of grain and place them in the basket to form a shock; the combination of rearwardly extending arms, on said carriage, provided with sockets; pivot members on said basket mounted in the sockets of the arms when the basket is in the receiving position; means allowing the basket to assume a discharging position; means allowing the carriage to advance without the basket; and means for drawing the pivots of the basket into the sockets as the basket is raised to the receiving position.

9. In apparatus for shocking grain which comprises a carriage having an operator's station thereon and a basket adjacent the station and in reach of the operator so that the operator can receive bundles of grain and place them in the basket to form a shock; the combination of means for releasing the basket to allow it to fall and discharge a shock; an axle for the carriage; clutch mechanism through which the basket is raised; a lever, on the carriage, having means for allowing the clutch to be engaged; a lever, on the frame, attached to said means; and chains connecting the lever with each side of the basket.

10. The combination in a grain shocker, of an axle; a ratchet wheel thereon; a pawl carrier loosely mounted on the axle; a pawl on the carrier arranged to engage the ratchet wheel; a lever pivoted to the pawl carrier, having an arm engaging a heel on the pawl, a second arm on said lever; an operating rod engaging said second arm; a third arm on the lever; a spring extending from said third arm to an arm on the pawl; and gate and basket operating means connected to the pawl carrier.

11. The combination in a grain shocker, of an axle; a ratchet wheel thereon; a pawl carrier pivotally mounted on the axle; a pawl on the carrier, arranged to engage the ratchet wheel; a heel on said pawl, a lever having an arm engaging said heel for holding the pawl out of engagement with the wheel; manually operated means for actuating the lever; and a releasing yoke in the path of the pawl when in engagement with the wheel to force the pawl out of engagement and to re-set the pawl-holding lever.

12. The combination in a shocker having a carriage and a basket mounted on the carriage; of means for retaining the basket in a vertical position to receive bundles of grain; means for releasing the basket to discharge a formed shock, said basket being of a frusto-pyramidal form; a single standard within the basket, coincident with the longitudinal centre line of the smaller base area of the frustrum and coincident with the plane thereof; and two standards within the basket, spaced apart from and substantially parallel to the sides and in the plane of the larger base area of the frustrum.

GEORGE INNES.